US 6,601,578 B1

(12) United States Patent
Furuhashi (10) Patent No.: US 6,601,578 B1
(45) Date of Patent: *Aug. 5, 2003

(54) LIQUID HEATING APPARATUS

(75) Inventor: Toshio Furuhashi, Shizuoka-ken (JP)

(73) Assignee: Eiken Industries Co., Ltd. (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/449,364

(22) Filed: Nov. 24, 1999

Related U.S. Application Data

(63) Continuation-in-part of application No. 09/421,047, filed on Oct. 19, 1999.

(30) Foreign Application Priority Data

Nov. 24, 1998 (JP) .......................... 10-333147

(51) Int. Cl.$^7$ ................................. A47J 27/26
(52) U.S. Cl. ................. 126/391.1; 126/390.1; 165/179
(58) Field of Search .............. 126/391.1, 390.1, 126/376.1; 165/179, 109.1; 99/403

(56) References Cited

U.S. PATENT DOCUMENTS

| 1,630,309 A | * | 5/1927 | Pitman .................... 126/391.1 |
| 2,149,696 A | | 3/1939 | Holmes |
| 2,290,784 A | * | 7/1942 | Turpin .................... 126/376.1 |
| 2,431,753 A | | 12/1947 | Holderle et al. |

(List continued on next page.)

FOREIGN PATENT DOCUMENTS

| CH | 442 655 | 1/1968 |
| EP | 0 125 750 | 11/1984 |
| EP | 0 159 750 | 10/1985 |
| FR | 1405410 | 5/1965 |
| FR | 2 504 001 | 10/1982 |
| GB | 2 098 856 A | 12/1982 |
| JP | 56-37496 | 9/1981 |
| JP | 57-92643 A | 9/1982 |
| JP | 61-45046 | 3/1986 |
| JP | 61-64837 | 5/1986 |
| JP | 61-52152 U | 8/1986 |
| JP | 3-114136 U | 11/1991 |

OTHER PUBLICATIONS

U.S. patent application 06/734,284 to Farnsworth et al., Dec. 1986.*
Photocopy of European Search Report dated May 6, 1999 (4 pages).
Photocopy of European Search Report dated Mar. 9, 1999 (2 pages).

*Primary Examiner*—Henry Bennett
*Assistant Examiner*—James G. Barrow
(74) *Attorney, Agent, or Firm*—Harness, Dickey & Pierce, P.L.C.

(57) ABSTRACT

A liquid heating apparatus includes: a liquid bath; a combustion chamber provided with a burner, and formed at one side on a lower portion of the liquid bath; and an exhaust pipe located horizontally in the liquid bath and extending from one side of the liquid bath toward the other side thereof. The apparatus heats the liquid bath by passing combustion gas generated in the combustion chamber into the exhaust pipe, with the exhaust pipe being formed into a cylinder shape having vertical side walls. A fin is integrally located on an inner surface of the side wall of the exhaust pipe along the longitudinal direction thereof. The fin has a predetermined heating surface chosen in accordance with a predetermined temperature gradient in a longitudinal direction of the exhaust pipe, and is located on only upper portion side on an inner surface of the exhaust pipe.

5 Claims, 7 Drawing Sheets

U.S. PATENT DOCUMENTS

| | | |
|---|---|---|
| 2,483,454 A | 10/1949 | Brown, Jr. |
| 2,569,112 A | 9/1951 | Miller et al. |
| 3,217,633 A | 11/1965 | Anetsberger |
| 3,760,793 A | 9/1973 | Anetsberger |
| 3,769,959 A * | 11/1973 | Parker .................... 165/109.1 |
| 3,990,433 A | 11/1976 | Keating |
| 4,214,627 A * | 7/1980 | Kunkel ...................... 165/179 |
| 4,397,299 A | 8/1983 | Taylor et al. |
| 4,602,612 A | 7/1986 | Schwizer |
| 4,628,903 A * | 12/1986 | Farnsworth et al. ..... 126/391.1 |
| 4,690,127 A * | 9/1987 | Sank ....................... 126/391.1 |
| 4,848,318 A | 7/1989 | Brewer |
| 4,858,592 A | 8/1989 | Hayek et al. |
| 6,044,839 A * | 4/2000 | Furuhashi .................... 99/403 |

* cited by examiner

Fig. 8 PRIOR ART

LIQUID HEATING APPARATUS

This application is a continuation-in-part of application, Ser. No. 09/421,047, filed Oct. 19, 1999.

BACKGROUND AND SUMMARY OF THE INVENTION

The present invention relates to a liquid heating apparatus such as a fryer, a noodle boiling machine or the like, and in particular, to a liquid heating apparatus which can effectively heat a liquid in a liquid bath.

Figure 7:
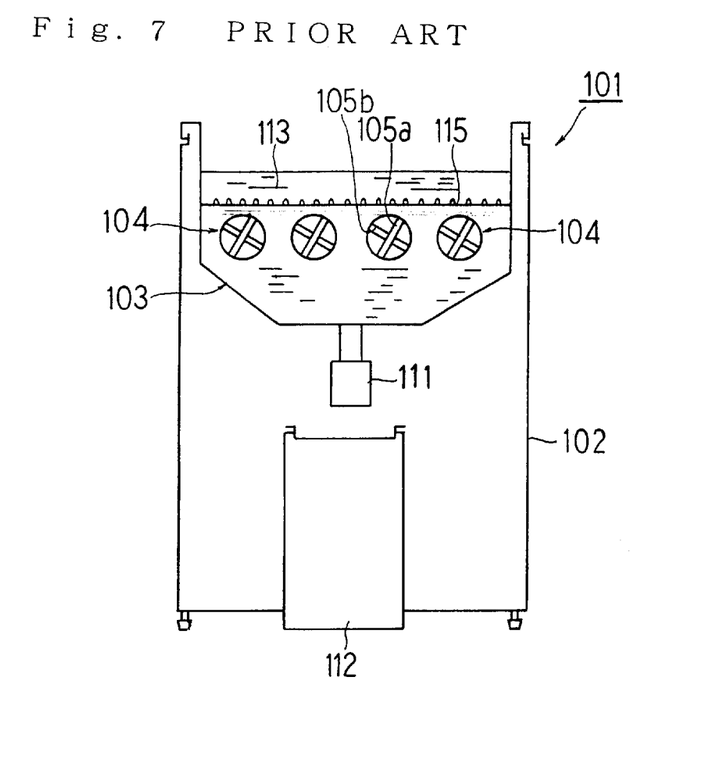
FIG. 7 is a sectional front view schematically showing a conventional liquid heating apparatus.
Figure 8:
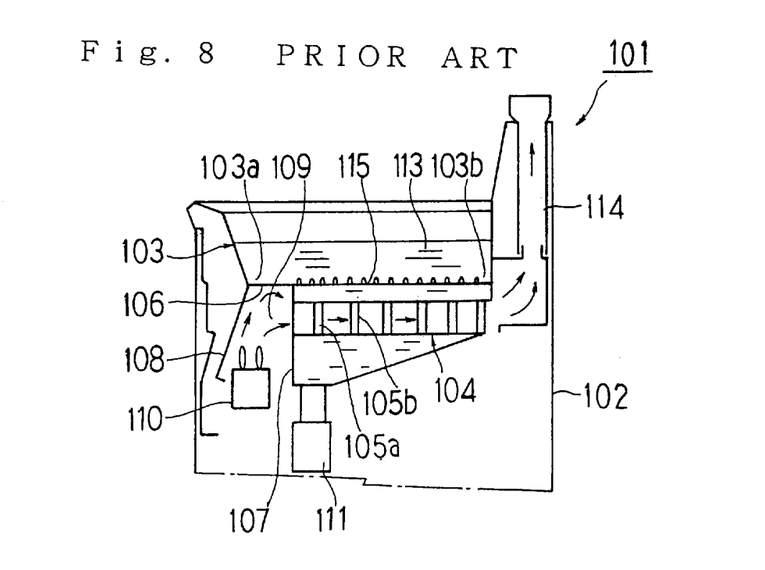
FIG. 8 is a sectional side view schematically showing principal parts of the conventional liquid heating apparatus of FIG. 7.

Conventionally, a fryer used as this type of liquid heating apparatus has been previously disclosed, such as, for example, the device shown in FIGS. 7 and 8, where the fryer 101 has a liquid bath 103 which is located on an upper portion of a main body 102, and a plurality of exhaust pipes 104 (four in FIG. 7) are arranged in a horizontal state at the substantially central position in a height direction of the liquid bath 103. These exhaust pipes extend penetratingly from one end side 103a (front side of the main body 102) toward the other side 103b (rear side of the main body 102). Each exhaust pipe 104 is provided with connective pipes 105a and 105b which are inclined right and left and alternately extend in a generally cross-shaped configuration in the exhaust pipe 104, at predetermined intervals in a longitudinal direction.

Moreover, a lower portion on one end side 103a (FIG. 8) of the liquid bath 103 is formed with a combustion chamber 109, which comprises a horizontal wall 106, a vertical wall 107, and a cover 108 downwardly extending from the front end of the horizontal wall 106. A gas burner 110 is arranged in the combustion chamber 109. A bottom portion of the liquid bath 103, on the lower portion of the exhaust pipe 104, is inclined so as to become low on its forward side, and a portion just under the bottom portion is provided with a drain cock 111. Furthermore, a waste oil box is arranged at a downward position of the drain cock 111 in the main body 102.

In the fryer 101 of FIGS. 7 and 8, when the combustion chamber 109 is filled with a combustion gas generated by a combustion of the gas burner 110, the horizontal wall 106 of the liquid bath 103 is directly heated so as to heat an oil 113 in the liquid bath 103. Then, the combustion gas flows into the exhaust pipe 104 and through the interior of exhaust pipe 104, as shown by the arrows A, and thus, is discharged from a discharge cylinder 114 to the atmosphere.

In this prior apparatus of FIGS. 7 and 8, four exhaust pipes 104 are arranged in a horizontal state. Therefore, the oil 113 in the liquid bath 103 is heated by the combustion gas flowing through the exhaust pipe 104 while being heated by the connective pipes 105a and 105b located in the exhaust pipe 104. As a result, an upper portion of the liquid bath from the exhaust pipe 104 becomes a high temperature section. On the other hand, a lower portion of the liquid bath from the exhaust pipe 104 becomes a low temperature section. Furthermore, a food is deep-fried in the oil 113 of the high temperature section while being prevented from falling into the low temperature section by a net 115 arranged on the upper portion of the exhaust pipe 104.

However, this fryer 101 of FIGS. 7 and 8 has a construction in which four cylindrical exhaust pipes 104 are arranged at the lower portion of the liquid bath 103, and the exhaust pipe 104 is provided with the totaled six connective pipes 105a and 105b arranged in cross-shaped configuration. For this reason, a heating surface area of the combustion gas flowing through the exhaust pipe 104 is small with respect to the exhaust pipe 104. As a result, it is difficult or impossible to effectively heat the oil 113 of the liquid bath 103 by means of the gas burner 110. Thus, the aforesaid conventional fryer 101 has a disadvantage in that it is difficult to obtain sufficient heat efficiency.

Moreover, a temperature of the combustion gas flowing through the exhaust pipe 104 in the fryer 101 becomes highest at an inlet side on the combustion chamber 109 side of the exhaust pipe 104, and becomes lowest at an outlet side on the discharge cylinder 114 side. In fryer 101, the total of six connective pipes 105a and 105b are merely extended in a diametrical direction of the exhaust pipe 104 and are arranged along the longitudinal direction thereof at substantially constant intervals. For this reason, it is difficult to obtain optimum heat conduction along a temperature gradient of the combustion gas flowing through the exhaust pipe 104. As a result, there is a disadvantage in that a temperature difference is formed in the oil 113 in the longitudinal direction of the liquid bath 103. In addition, a pressure loss results in an exhaust pipe 104 section forming a heat exchange section, and the outer dimension of the exhaust pipe section must be inordinately large. For this reason, it is difficult to perform cleaning or maintenance.

The present invention has been made taking the aforesaid problems in the prior art into consideration. One object of the invention is to provide a liquid heating apparatus that can obtain sufficient heat efficiency by providing a large heating surface area by way of combustion gas flowing through an exhaust pipe located in a liquid bath and by preferably passing the combustion gas therethrough.

A further object of the invention is to provide a liquid heating apparatus which can obtain sufficient heat efficiency and can uniformly heat a liquid in the liquid bath.

Still another object of the invention is to provide a liquid heating apparatus having simplified heat conduction fins so as to provide the apparatus at a low cost.

To achieve the above objects, the present invention provides a liquid heating apparatus that includes: a liquid bath; a combustion chamber which is provided with a burner and is formed at one side on a lower portion of the liquid bath; and an exhaust pipe which is located substantially horizontally in the liquid bath and which extends from one side of the liquid bath toward the other side thereof and thus heats a liquid in the liquid bath by passing a combustion gas generated in the combustion chamber through the exhaust pipe. The exhaust pipe is preferably of a tubular shape having a vertical side wall with a fin integrally located on an inner surface of the side wall of the exhaust pipe along a longitudinal direction thereof.

With the above construction, the combustion gas generated by the combustion of the burner flows into the exhaust pipe from the combustion chamber and then flows through the exhaust pipe so as to heat the fins which are integrally fixed to the inner surface of the exhaust pipe during the passage of the combustion gas. The fins serve to substantially enlarge the heating surface area of the combustion gas with respect to that of the exhaust pipe, and the fins are located on the inner surface of the side wall or wall of the tubular exhaust pipe. Therefore, heat-exchanged combustion gas is not confined in the upper portion of the exhaust pipe by high temperature combustion gas from the burner, so that this combustion gas can be preferably passed through the exhaust pipe. As a result, heat exchange is preferably performed over the entire region of the longitudinal direction of the fin or fins. The heat of the fin is thus more effectively transferred to the exhaust pipe so that liquid around the upper portion of the exhaust pipe is more effectively heated and sufficient heating efficiency is obtained.

Further, the invention preferably provides the liquid heating apparatus wherein the fin has a heating surface area which is predetermined in accordance with a temperature gradient in a longitudinal direction of the exhaust pipe. With the above construction, for example, the height of the fin is lower at an inlet side of the exhaust pipe, where the combustion gas temperature is high, and is higher at an outlet side of the exhaust pipe, where the combustion gas temperature is low. Thus, the heat energy of the combustion gas can be further effectively transferred to the exhaust pipe by way of the fin or fins. As a result, improved heating efficiency can be obtained.

The invention also preferably provides the liquid heating apparatus wherein the fin is formed with a generally U-shaped cross section and is fixed to the inner surface of the exhaust pipe at a predetermined interval.

The invention also preferably provides the liquid heating apparatus wherein the fin can be formed into a generally L-shape cross section, and the fin is fixed to the inner surface of the side wall of the exhaust pipe. With either of the above constructions, the fin has a U-shaped or L-shaped cross section and therefore its shape is greatly simplified and fixed to the plate at predetermined intervals, thereby making it less expensive to manufacture the exhaust pipe and thus providing a liquid heating apparatus at low cost.

DETAILED DESCRIPTION OF THE PREFERRED EMBODIMENTS

FIGS. 1 through 5 show one embodiment of a fryer liquid heating apparatus according to the present invention. One skilled in the art will readily recognize that the invention is also applicable to other types of liquid heating apparatuses.

Figure 1:
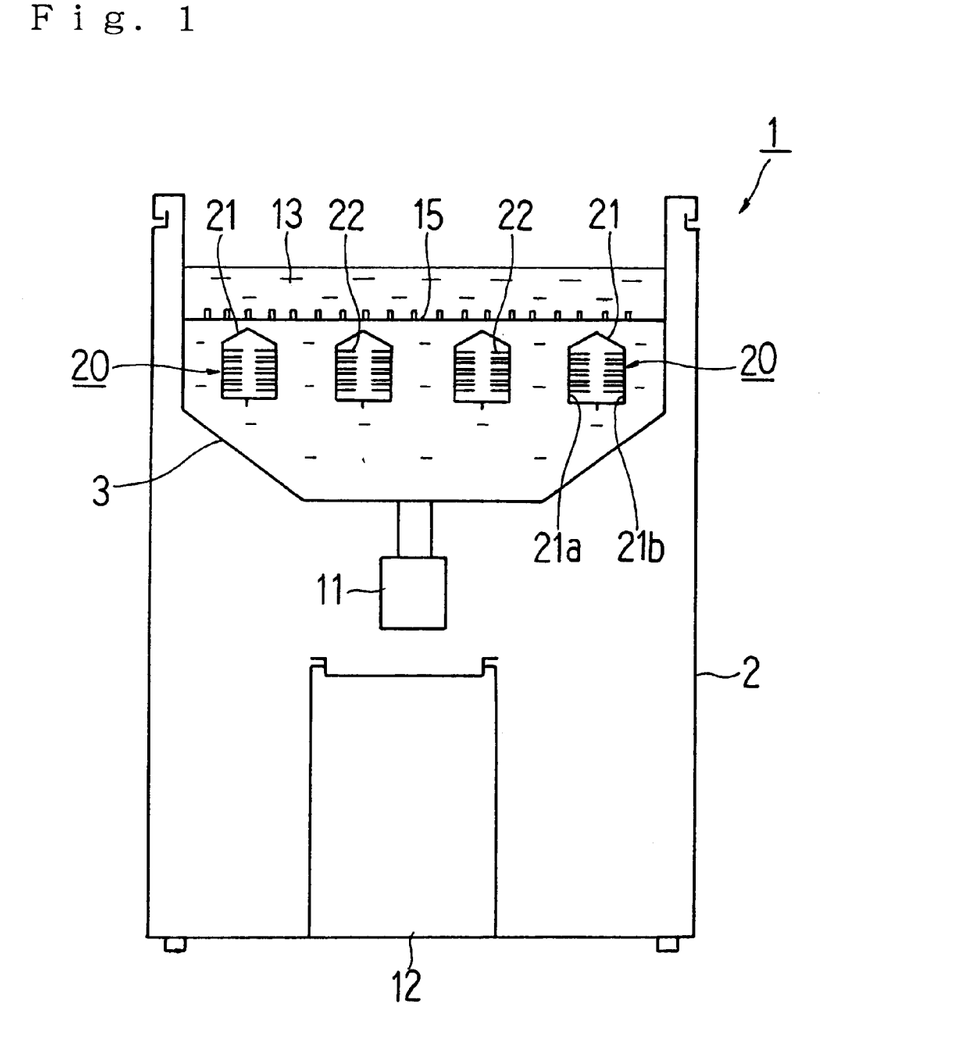
FIG. 1 is a sectional front view schematically showing one embodiment of a liquid heating apparatus according to the present invention used as a fryer.
Figure 2:
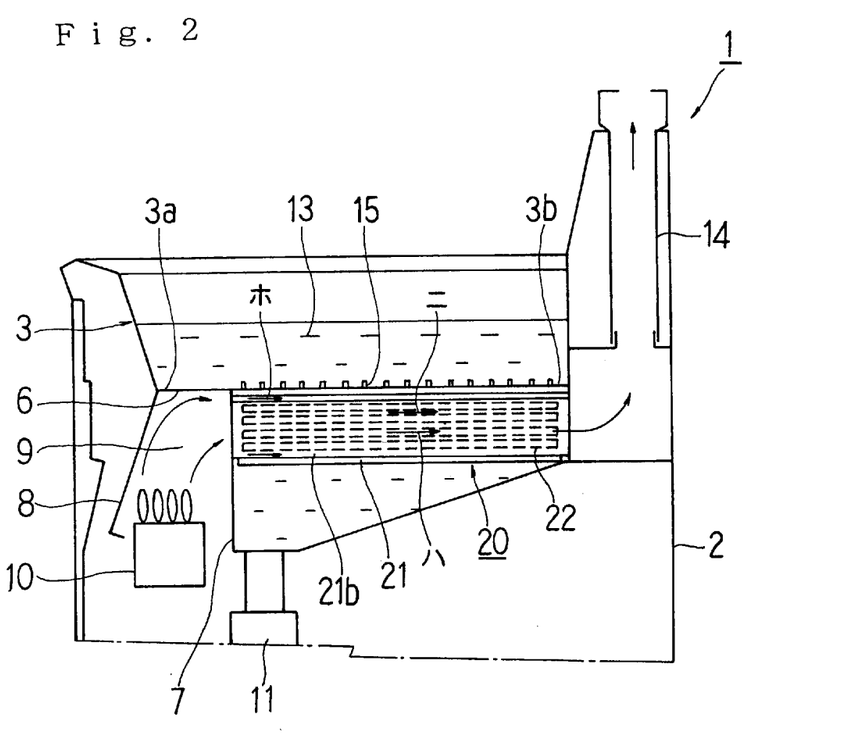
FIG. 2 is a sectional side view schematically showing principal parts of the liquid heating apparatus of FIG. 1.

As shown in FIGS. 1 and 2, in a fryer 1, an upper portion of a main body 2 is provided with a liquid bath 3, and a plurality of exhaust pipes 20 (four in FIG. 1) are located below a net 15 in the liquid bath 3. These exhaust pipes 20 extend from one end side 3a of the liquid bath 3 toward the other end side 3b thereof in a substantially horizontal direction. The exhaust pipe 20 shown in the drawings is preferably composed of a stainless generally tubular member 21 having a generally pentagonal cross section, and a copper fin 22 is fixed to an inner surface of the right and left vertical side walls 21a and 21b of the generally pentagonal tubular member 21 projecting in a generally horizontal direction. Alternately, tubular members of other straight-sided cross-sectional shapes can be used. Generally cylindrical members, as disclosed in Applicant's copending application, Ser. No. 09/421,047, filed Oct. 19, 1999, can also be used.

Figure 3:
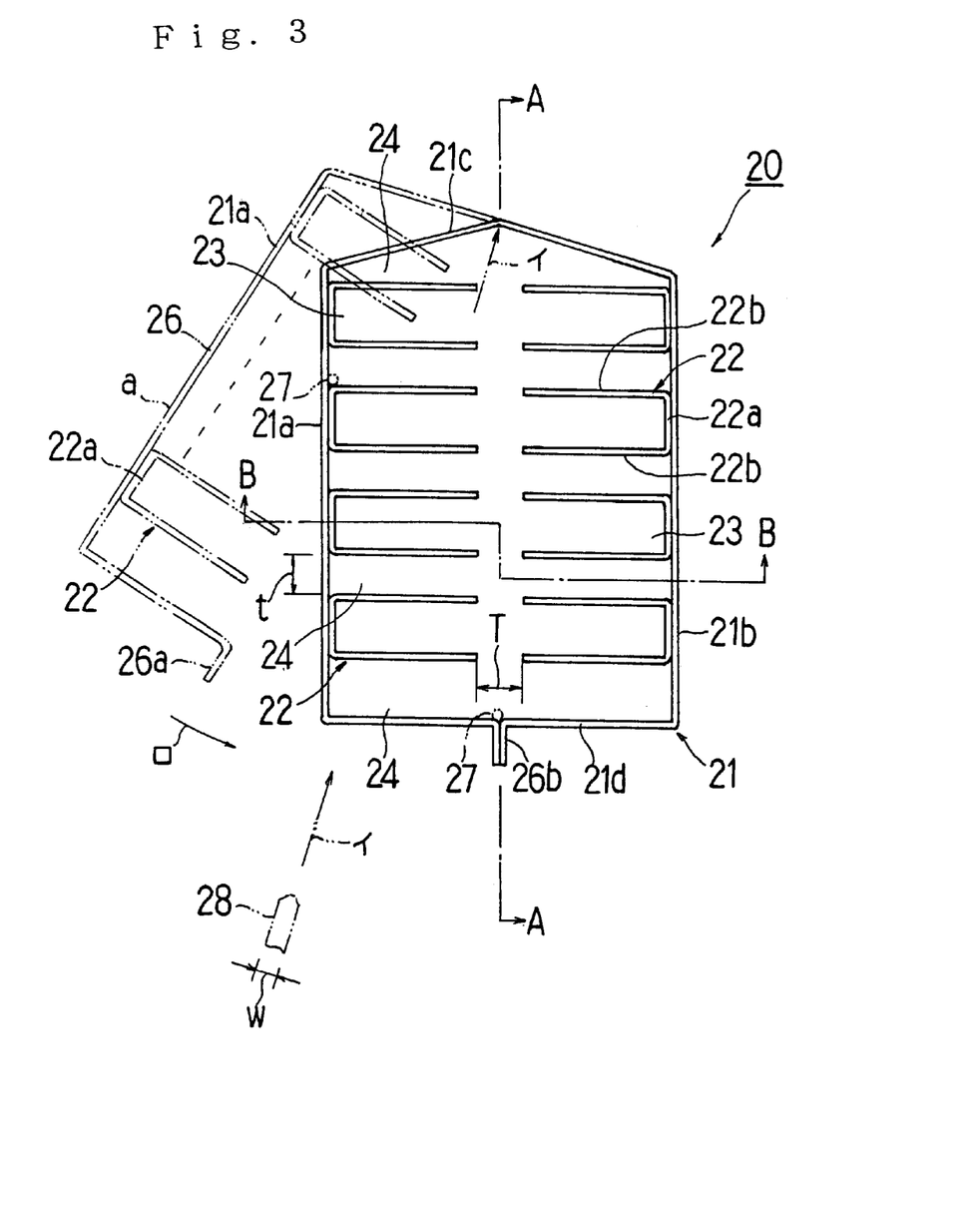
FIG. 3 is a view showing interior principal parts of an exhaust pipe of the liquid heating apparatus of FIG. 1.
Figure 4:
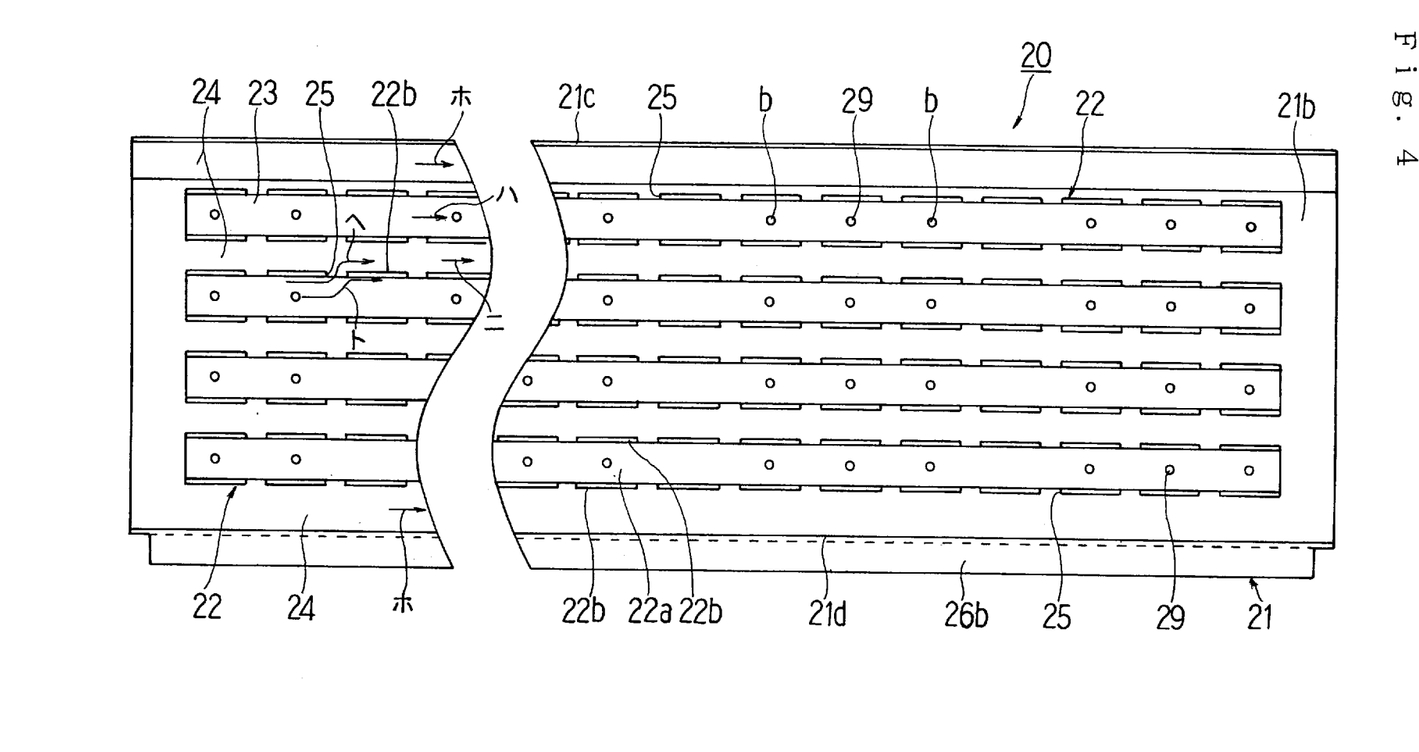
FIG. 4 is a cross sectional view of the exhaust pipe cut along a line 4—4 of FIG. 3.
Figure 5:
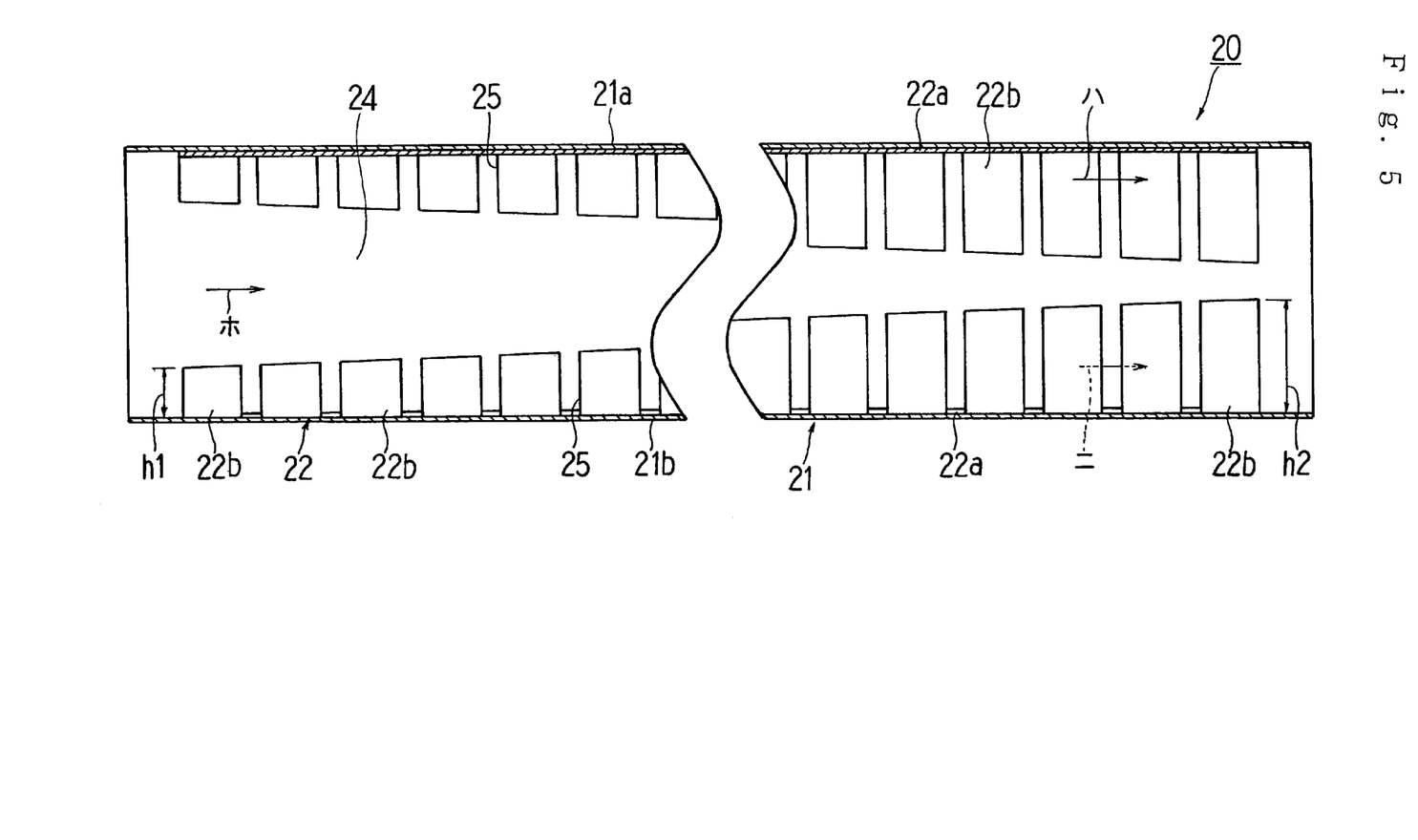
FIG. 5 is a cross sectional view of the exhaust pipe cut along a line 5—5 of FIG. 3.

The fin 22 can be formed with a generally U-shaped cross section, as shown in FIGS. 3 through 5. A fixture portion 22a of the fin 22 is fixed to the side walls 21a and 21b of the cylindrical member 21 by means of brazing, for example, at a predetermined interval, and thereby, a pair of side wall portions 22b of the fin 22 are projected horizontally toward the center of the tubular member 21. A predetermined interval T is set between the distal ends of the side wall portions 22b of the fin 22. By such a fin arrangement, a combustion gas flow passageway 23 is formed between the side wall portions 22b of each fin 22, and also, a combustion gas flow passageway 24 is formed between the side wall portions 22b of adjacent fins 22 and between the uppermost and lowermost side wall portions 22a and upper wall 21c and lower wall 21d of the tubular member 21.

Moreover, the pair of side wall portions 22b of each fin 22 is formed with a plurality of notches 25, with the fixture portions 22a at predetermined intervals in the longitudinal direction, with such intervals being constant or being gradually wider and narrower. These notches 25 serve to prevent warpage of the fin 22, and form an exhaust passageway of a heat-exchanged combustion gas. Further, the side wall portions 22b of the fin 22 have a linearly large height.

More specifically, as shown in FIG. 5, in the fin 22, the vertical wall 22b on a combustion gas inlet side situated at the combustion chamber 9 side is formed with a height h1 that is smaller than a height h2 of the vertical wall 22b on a combustion gas outlet side situated at the discharge cylinder 14 side. The height of the vertical wall 22b of the fin 22 is linearly varied, and the fin 22 portions divided by each notch 25 may also be stepwise varied in height, and may be varied in a curve shape overall along the fin 22. Such variation is determined in accordance with a temperature gradient in the longitudinal direction of the tubular member 21.

Moreover, the fins 22 are arranged on the interior of the right and left side walls 21a and 21b of the generally pentagonal tubular member 21 so that their distal ends face each other. The fin 22 situated on the uppermost portion is arranged at a position relatively near to an angular, generally V-shaped, upper wall 21c of the tubular member 21. A lowermost (bottom) wall 21d of the tubular member 21 of the fin 22 is provided with a pair of flange portions 26a and 26b at the central portion thereof. These flange portions 26a and 26b are preferably brazed as described later, and thus the tubular member 21 is preferably formed into a substantially pentagonal shape.

The fin 22 is manufactured in the following manner. First, a sheet of plate 26 is cut into a predetermined outer shape, and then the plate 26 is bent so as to form a predetermined shape as shown by the double-dashed line of FIG. 3, i.e., in a state such that the flange portions 26a and 26b are open. Thereafter, the fixture portion 22a of the fin 22 is fixed to a portion equivalent to the inner surface of the side walls 21a and 21b of the plate 26.

The fixation of the fin 22 to the plate 26 is carried out in the following manner. A portion b shown in FIG. 4 is temporarily fixed by spot welding, and thereafter a copper brazing filler metal (see FIG. 3) is introduced onto a joint portion of the fin 22 and the plate 26. The copper brazing filler metal 27 is then heated to its melting point, and thereby the fin 22 is brazed to the plate 26. In this case, the fixation of the fin 22 to the plate 26 is not limited to brazing. Other suitable fixing methods such as seam welding, high frequency welding, or the like, may be alternatively employed in accordance with the material qualities of the fin 22 and the plate 26.

After the fins 22 are fixed to the plate 26, a bending jig 28 (as shown schematically by double-dashed line of FIG. 3) is pressed against the inner surface of the plate 26 corresponding to the intermediate portion of the uppermost 21c of the tubular member 21, as shown schematically by an arrow a. The plate 26 is then bent in the direction of arrow b. Therefore, an interval T between the distal ends of the side walls 22b of the fin 22 fixed to the side walls 21a and 21b of the tubular member 21, is set to be larger than a width W of the bending jig 28 so that the bending jig 28 can be inserted and removed. When plate 26 is bent, the flange portions 26a and 26b are abutted against each other and are temporarily fixed by spot welding. Thereafter, they are fully fixed preferably using a copper brazing filler metal 27.

In manufacturing the exhaust pipe 20, the fixture portion 22a of the fin 22 is previously formed with a plurality of brazing confirming holes 29 (see FIG. 4) penetrating through the fin 22 at a predetermined interval. By doing so, the melted copper brazing filler metal is suitably poured into the holes 29, therefore confirming a brazing of the fin 22 with respect to the plate 26 (side walls 21a and 21b of the tubular member 21).

Next the operation of the fryer 1 will be described with reference to FIGS. 2 through 5. First, a predetermined amount of an oil 13 (such as an edible oil) is put in the liquid bath 3 as a liquid. A gas burner 10 (such as a Bunsen gas burner) is lit and combustion gas generated by the gas burner 10 directly heats the horizontal wall 6 of the liquid bath 3 and flows into the exhaust pipe 20 from an inlet of the exhaust pipe 20. The gas is then discharged from the discharge cylinder 14 to the atmosphere.

The combustion gas flowing through the exhaust pipe 20 flows through passageways 23 and 24 formed by the fins 22 as shown by arrows c and d in FIG. 4, and also flows through portions having no fin 22, as shown by an arrow e in FIG. 4. In particular, the temperature of the fin 22 itself is increased by the combustion gas flowing through passageways 23 and 24 formed by the fins 22.

In this embodiment, the fin 22 has a generally U-shaped cross-sectional shape so that its heating surface area is large and therefore the vertical wall 22b of the fin 22 is sufficiently heated by the combustion gas so that the temperature of the fins 22 can be effectively raised. As a result, a heat of the fins 22 is transferred to the tubular member 21 via the fixture portions 22a so as to heat the tubular member 21. Moreover, the combustion gas is heat-exchanged by heating the fin 22, and then, as shown by arrow f of FIG. 4 as the combustion gas flows from the flow passageway 23 into the flow passageway 24 along the slit or notch 25 as it is discharged into the discharge cylinder 14. Thereafter, high temperature combustion gas flowing through the flow passageway 23 flows as shown by an arrow g in FIG. 4 so as to heat the next side wall 22b of the fin 22.

The heat-exchanged combustion gas is not confined in the fin 22 by the high temperature combustion gas flowing through the flow passageway 23. More specifically, the flow passageways 23 and 24 are vertically partitioned because the side wall 22b of the fin 22 is horizontal. Thus, the rising high temperature combustion gas flows through each of flow passageways 23 and 24. Furthermore, the combustion gas is pushed upwardly from the notch 25 of the fin 22 by the rising action of the high temperature combustion gas thus preventing the combustion gas heated by the high temperature combustion gas from being confined in the fin 22, that is, preventing a stagnation of the combustion gas.

The tubular member 21 and the oil 13 contacting an outer peripheral surface of the tubular member 21 are heated to a predetermined temperature. Furthermore, the heating surface area of the fin 22 is predetermined in accordance with a temperature gradient in order to obtain more uniform temperature in the longitudinal direction of the tubular member 21. Thus, the oil 13 is of a substantially more uniform temperature in the overall region of the liquid bath 3. As a result, food in the oil 13 is more uniformly fried.

As described above, in the fryer 1 of the above embodiment, a plurality of fins 22 are longitudinally fixed to the inner surface of the side walls 21a and 21b of the exhaust pipe 20 located in the liquid bath 3. Thus adjacent the side wall 22b of the fin 22 the exhaust pipe 20 has a heating surface area of about 3 to 5 times as much as if the exhaust pipe had no fin 22. Furthermore, the temperature of the combustion gas flowing through the exhaust pipe 20 is more effectively transferred to the exhaust pipe 20 via the fin 22. As a result, it is possible to heat the oil 13 in the liquid bath 3 to a predetermined temperature by the exhaust pipe 20 in a shorter time, greatly improving the fryer's heating efficiency.

The exhaust pipe 20 is preferably formed into a substantially pentagonal shape, and the fin 22 is fixed to the inner surface of the side walls 21a and 21b so that the side wall portion 22b of the fin 22 is horizontal. Therefore, the combustion gas heated by heat-exchange with the fin is not confined in the region of the fin 22 and thus the combustion gas passes into the flow passageways 23 and 24 formed by the fin 22. As a result, the heating efficiency of the fryer 1 is further improved.

Furthermore, the longitudinal height of the fin 22 can become gradually higher from the inlet side toward the outlet side. This serves to increase the heating surface area on the outlet side where the combustion gas temperature is low, thus further improving the heating efficiency of the combustion gas to the exhaust pipe 20. This makes it possible to have a small longitudinal temperature difference in the liquid bath 3 and thus to make the temperature of oil 13 in the liquid bath 3 more uniform.

The fin 22 can be formed into a U-shaped cross-section so as to simplify a shape and thus the manufacture of the fin 22, resulting in lower cost.

Furthermore, the fin 22 is formed with the notches 25 at predetermined longitudinal intervals. This serves to prevent or at least minimize warping of the fin 22 by the heat of the combustion gas. The fixture portions 22a of the fins 22 are preferably formed with the brazing through the confirming hole 29, and therefore, it is possible to readily confirm a high quality brazing. As a result, a high quality exhaust pipe 20 can be obtained. In addition, the uppermost wall of the tubular member 21 and the side walls 21a and 21b extending therefrom are formed of a sheet of plate 26 in order to stabilize the shape of the exhaust pipe 20, and thus improve the reliability of the fryer 1.

The exhaust pipe 20 forming the heat exchange section is provided with the fin or fins 22, thereby reducing the pressure loss in the exhaust pipe 20 section. Thus, there is no need for a large outer dimension of the exhaust pipe 20, and cleaning to remove caked oil gathered in the bottom portion of the bath is more easily accomplished.

Figure 6:
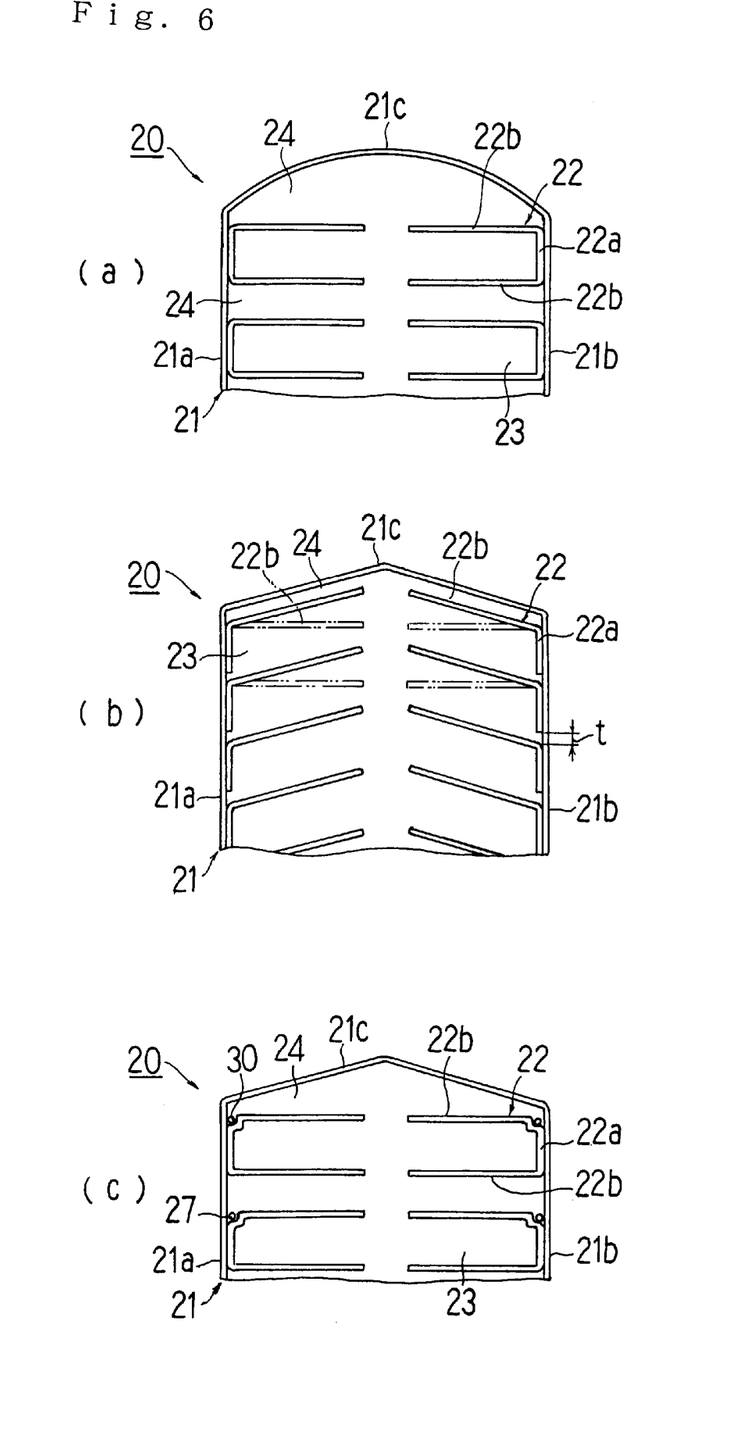
FIGS. 6A through 6C are front views showing principal parts of other exemplary constructions of the exhaust pipe.

FIGS. 6A through 6C each show an exemplary alternative modification of the exhaust pipe 20 described above. In FIG. 6, like reference numerals are used to designate the same parts as the above-described embodiment. First, an exhaust pipe 20 shown in FIG. 6A has the uppermost wall 21c of the tubular member 21 formed into a shape of circular arc, rather than the V-shape described above. This exhaust pipe 20 in other respects has the same operation and effect as that described above.

An exhaust pipe 20 shown in FIG. 6B has the fin 22 formed into a generally L-shaped cross section, and the fixture portion 22a of the fin is fixed to the inner surface of the side walls 21a and 21b of the tubular member 21 at a predetermined interval t. The side wall portion 22b of the fin 22 is inclined so that its distal end is oriented upwardly. This exhaust pipe 20 has the same operation and effect as that described above, as well as having the effect of simplifying a shape of the fin 22. In this modification example, as shown by a double-dashed line in FIG. 6B, the side wall portions 22b of the fins 22 may be horizontal like the fins described above.

An exhaust pipe 20 shown in FIG. 6C has a recessed (concave) portion 30 formed at a corner portion of the fixture portion 22a of the fin 22 having a U-shaped cross section. A copper brazing filler metal 27 is preferably introduced into the recessed portion 30 so as to carry out the brazing operation in order to simplify and facilitate the manufacture of the tubular member 21. Thus, the fin 22 is more securely fixed to the side wall portion 21a and 21b, and therefore, durability of the exhaust pipe 20 is improved.

The present invention is not limited to the above embodiments and modification examples. For example, the recessed portion 30 shown in FIG. 6C may be applied to the exhaust pipe 20 according other embodiments. Also, the fin 22 having a U-shaped cross section and the fin 22 having an L-shaped cross section may be combined. Moreover, in one of the above embodiments, four fins 22 are provided, and these fins 22 are all formed into the identical shape. For example, a plurality of fins 22 having different lengths may be used, and the number, width, and length of such fins 22, as well as the number and shape of the notches 25, are not limited to that of any of the above exemplary embodiments.

In one of the above embodiments, the uppermost wall 21c of the tubular member 21 has V-shape or a circular arc, but other shapes may also be used. Because an outer surface of the uppermost wall 21c directly contacts with a high temperature liquid, the uppermost wall 21c preferably should have a large area. Moreover, the interval between the uppermost wall 21c and the side wall portion 22b of the fin 22 situated on the uppermost position is not limited to that of the above embodiments and may be set to other suitable intervals.

The liquid heating apparatus of the present invention is not limited to the exemplary fryer 1 and is applicable to various other liquid heating apparatuses for heating a liquid, such as, for example, a noodle boiling machine. Furthermore, the shape of the liquid bath 3, the number of the exhaust pipes 20, the type of gas burner 10 and its location are merely shown as examples. Various changes and modifications are possible without departing from the spirit and scope of the present invention.

As is evident from the above description, according to one aspect of the invention, the fins are integrally located on the inner surface of the vertical side wall of the exhaust pipe arranged in the liquid bath. Therefore, the heating surface area for the combustion gas heat is greatly increased with respect to the exhaust pipe, and the heat-exchanged combustion gas is prevented from being confined in the fins. Accordingly, it is possible to effectively heat a liquid in the liquid bath, and thus, to obtain an improved heat efficiency.

Furthermore, according to another aspect of the invention, the heating surface area of the fin or fins is set in accordance with the temperature gradient of the combustion gas flowing through the exhaust pipe. Therefore, it is possible to effectively transfer the heat of the combustion gas to the exhaust pipe by way of the fin, and thus, to obtain improved heat efficiency.

According to yet another aspect of the invention, the fin or fins are formed into U-shaped or L-shaped cross sections in order to simplify the shape of the fins, thus facilitating the manufacture of the exhaust pipe at a low cost.

What is claimed is:

1. A liquid heating apparatus comprising: a liquid bath; a combustion chamber provided with a burner, said combustion chamber being formed on a side on a lower portion of the liquid bath; and at least one exhaust pipe located in the liquid bath in a substantially horizontal state extending from one side of the liquid bath toward the other side thereof in order to heat a liquid in the liquid bath by receiving a combustion gas generated in the combustion chamber passing through the exhaust pipe, said exhaust pipe being formed into a generally tubular shape having at least one vertical side wall, said exhaust pipe being separate from and downstream of both said combustion chamber and said burner; and a fin fixedly located on and extending from an inner surface of said side wall of said exhaust pipe along a longitudinal direction thereon, said fin defining longitudinal passageways, said fin having a height which varies along the longitudinal passageways from shorter to longer such that said longitudinal passageways merge with one another at a tip on the extending fin at a point furthest away from said burner, said fin tip directing low temperature combustion gas, which has performed a thermal exchange with said fin heating said fin, into a merged passage formed by the passageways, additional high temperature combustion gas flowing along said longitudinal merged passage contacts said longitudinal fin downstream of said low temperature combustion gas, said additional high temperature combustion gas heating a downstream portion of said fin and providing substantially uniform heat exchange in the longitudinal direction.

2. The liquid heating apparatus according to claim 1, wherein the fin has a predetermined heating surface area sized in accordance with a predetermined temperature gradient in a longitudinal direction of the exhaust pipe.

3. The liquid heating apparatus according to claim 1, wherein the fin is formed into a U-shaped cross section and is fixed to said side wall of the inner surface of said exhaust pipe at predetermined intervals.

4. The liquid heating apparatus according to claim 1, wherein the fin is formed into an L-shaped cross section and is fixed to the inner surface of said side wall of said exhaust pipe.

5. A liquid heating apparatus comprising: a liquid bath; a combustion chamber provided with a burner, said combustion chamber being positioned on a side on a lower portion of the liquid bath; and at least one exhaust pipe located in and passing through the liquid bath in a substantially horizontal state extending from one side of the liquid bath toward the other side thereof in order to heat a liquid in the liquid bath, at least one exhaust pipe receiving a combustion gas generated in the combustion chamber, said combustion gas passing through the exhaust pipe, said at least one exhaust pipe end exiting said combustion gas to ambient, said exhaust pipe being formed into a generally tubular shape having at least one vertical side wall, said exhaust pipe being separate from and downstream of both said combustion chamber and said burner; and a fin fixedly located on and extending from an inner surface of said side wall of said exhaust pipe along a longitudinal direction thereon, said fin defining longitudinal passageways from shorter to longer such that said longitudinal passageways merge with one another at a tip on the extending fin at a point furthest away from said burner, said fin tip directing low temperature combustion gas, which has performed a thermal exchange with said fin heating said fin, into a merged passage formed by the passageways, additional high temperature combustion gas flowing along said longitudinal merged passage contacts said longitudinal fin downstream of said low temperature combustion gas, said additional high temperature combustion gas heating a downstream fin and providing substantially uniform heat exchange in the longitudinal direction.

\* \* \* \* \*